United States Patent
Dax et al.

(10) Patent No.: US 7,272,453 B2
(45) Date of Patent: Sep. 18, 2007

(54) METHOD AND APPARATUS FOR UTILIZING A SEQUENCE INTERPRETER APPROACH TO CONTROL LOGIC OF A PROGRAMMABLE LOGIC CONTROLLER

(75) Inventors: William John Dax, Orefield, PA (US); Jeffery Van Bauer, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 289 days.

(21) Appl. No.: 11/000,148

(22) Filed: Nov. 30, 2004

(65) Prior Publication Data

US 2006/0116777 A1   Jun. 1, 2006

(51) Int. Cl.
G05B 11/01 (2006.01)
G06F 3/00 (2006.01)
G06F 12/00 (2006.01)
(52) U.S. Cl. .................. 700/23; 710/13; 710/23; 711/115
(58) Field of Classification Search ............ 700/15, 700/25, 23; 707/103 R, 103 Z; 710/13, 710/23; 711/115
See application file for complete search history.

(56) References Cited

U.S. PATENT DOCUMENTS

| | | | | |
|---|---|---|---|---|
| 4,751,672 | A * | 6/1988 | Yamada | 700/7 |
| 5,038,318 | A | 8/1991 | Roseman | |
| 5,485,590 | A * | 1/1996 | Hyatt et al. | 711/115 |
| 5,659,705 | A * | 8/1997 | McNutt et al. | 711/115 |
| 5,923,903 | A * | 7/1999 | Alvarez-Escurra et al. | 710/62 |
| 6,078,969 | A * | 6/2000 | Ichimura et al. | 710/6 |
| 6,094,718 | A | 7/2000 | Tanaka et al. | |
| 7,018,448 | B2 * | 3/2006 | Wodjenski et al. | 95/116 |
| 2003/0062878 | A1 | 4/2003 | Scoggins et al. | |
| 2004/0133753 | A1 * | 7/2004 | Fulton et al. | 711/155 |

FOREIGN PATENT DOCUMENTS

| | | |
|---|---|---|
| EP | 0 621 522 A2 | 10/1994 |
| JP | 55-069873 A | 5/1980 |
| JP | 63-271530 A | 11/1988 |
| JP | 03-204004 | 9/1991 |
| JP | 03-269728 A | 12/1991 |
| JP | 05-035469 | 2/1993 |
| JP | 05-046229 A | 2/1993 |
| JP | 10-240522 | 9/1998 |
| JP | 11-242509 | 9/1999 |
| JP | 11-327611 | 11/1999 |

OTHER PUBLICATIONS

Air Products and Chemicals, Inc., Gasguard® AP Controllers (AP2), 325-0126, 2000.
Air Products and Chemicals, Inc., Gasguard® Gas Delivery Systems (AP3), 325-0126, 2000.
Air Products and Chemicals, Inc., Gasguard® Equipment Maintenance Services, 325-0126, 2000.

* cited by examiner

Primary Examiner—Thomas K. Pham
(74) Attorney, Agent, or Firm—Rosaleen P. Morris-Oskanian

(57) ABSTRACT

The work memory of a programmable logic controller (PLC) is loaded with only one instruction at a time from the PLC's load memory which contains the entire instruction set to control a process. Each instruction has a format which contains at least one option code which must be evaluated to be true by the PLC interpreter before the corresponding instruction can be executed. If the interpreter evaluates the at least one option code to be false, the instruction is not executed and the next instruction is transferred from the load memory to the work memory and its corresponding option codes are then evaluated.

7 Claims, 11 Drawing Sheets

Load Memory

Work Memory

| Sequence Command Structure | | |
|---|---|---|
| Name | Data type | Size (bytes) |
| Command | char | 1 |
| Param 1 | byte | 1 |
| Param 2 | byte | 1 |
| Param 3 | byte | 1 |
| OpCode 1 | byte | 1 |
| OpCode 2 | byte | 1 |
| | Total: | 6 |

Command = Command indicator
Param1, Param2, Param3 = three parameters
OpCode 1, OpCode2 = two option codes Option Codes (ConfigData.OptionCode[Num])

```
OpCode                                    Setting
  #     Description              YES                    NO
  1  = Valve A present           1  -  1h           129  -  81h
  2  = Valve B present           2  -  2h           130  -  82h
  3  = Valve C present           3  -  3h           131  -  83h
  4  = Valve D present           4  -  4h           132  -  84h
  5  = Valve E present           5  -  5h           133  -  85h
  6  = PT A present              6  -  6h           134  -  86h
  7  = PT B present              7  -  7h           135  -  87h
  8  = PT C present              8  -  8h           136  -  88h
  9  = PT D present              9  -  9h           137  -  89h
 10  = PT E present             10  -  Ah           138  -  8Ah
 11  = AXO                      11  -  Bh           139  -  8Bh
 12  = Internal purge option    12  -  Ch           140  -  8Ch
 13  = AirOp cylinder option    13  -  Dh           141  -  8Dh
 14  = Temp option              14  -  Eh           142  -  8Eh
 15  = Flammable option         15  -  Fh           143  -  8Fh
 16  = Barcode option           16  -  10h          144  -  90h
 17  = Regulator present        17  -  11h          145  -  91h
 18  = Flow Switch option       18  -  12h          146  -  92h
 19  = Purifier present         19  -  13h          147  -  93h
 20  = Scale A present          20  -  14h          148  -  94h
 21  = Scale B present          21  -  15h          149  -  95h
 22  = Option Code #22          22  -  16h          150  -  96h
 23  = Option Code #23          23  -  17h          151  -  97h
 24  = Option Code #24          24  -  18h          152  -  98h
 25  = Option Code #25          25  -  19h          153  -  99h
 26  = Option Code #26          26  -  1Ah          154  -  9Ah
 27  = Option Code #27          27  -  1Bh          155  -  9Bh
 28  = Option Code #28          28  -  1Ch          156  -  9Ch
 29  = Option Code #29          29  -  1Dh          157  -  9Dh
 30  = Option Code #30          30  -  1Eh          158  -  9Eh
 31  = Option Code #31          31  -  1Fh          159  -  9Fh
 32  = Option Code #32          32  -  20h          160  -  A0h
```

FIG. 11A

Option Codes (ConfigData.OptionCode[Num]) (continued)

```
                                        Setting
OpCode                              _____
  #     Description              YES              NO
 33  =  Option Code #33        33  -  21h      161  -  A1h
 34  =  Option Code #34        34  -  22h      162  -  A2h
 35  =  Option Code #35        35  -  23h      163  -  A3h
 36  =  Option Code #36        36  -  24h      164  -  A4h
 37  =  Option Code #37        37  -  25h      165  -  A5h
 38  =  Option Code #38        38  -  26h      166  -  A6h
 39  =  Option Code #39        39  -  27h      167  -  A7h
 40  =  Option Code #40        40  -  28h      168  -  A8h
 41  =  Option Code #41        41  -  29h      169  -  A9h
 42  =  Option Code #42        42  -  2Ah      170  -  AAh
 43  =  Option Code #43        43  -  2Bh      171  -  ABh
 44  =  Option Code #44        44  -  2Ch      172  -  ACh
 45  =  Option Code #45        45  -  2Dh      173  -  ADh
 46  =  Option Code #46        46  -  2Eh      174  -  AEh
 47  =  Option Code #47        47  -  2Fh      175  -  AFh
 48  =  Option Code #48        48  -  30h      176  -  B0h
 49  =  Option Code #49        49  -  31h      177  -  B1h
 50  =  Option Code #50        50  -  32h      178  -  B2h
 51  =  Option Code #51        51  -  33h      179  -  B3h
 52  =  Option Code #52        52  -  34h      180  -  B4h
 53  =  Option Code #53        53  -  35h      181  -  B5h
 54  =  Option Code #54        54  -  36h      182  -  B6h
 55  =  Option Code #55        55  -  37h      183  -  B7h
 56  =  Option Code #56        56  -  38h      184  -  B8h
 57  =  Option Code #57        57  -  39h      185  -  B9h
 58  =  Option Code #58        58  -  3Ah      186  -  BAh
 59  =  Option Code #59        59  -  3Bh      187  -  BBh
 60  =  Option Code #60        60  -  3Ch      188  -  BCh
 61  =  Option Code #61        61  -  3Dh      189  -  BDh
 62  =  Option Code #62        62  -  3Eh      190  -  BEh
 63  =  Option Code #63        63  -  3Fh      191  -  BFh
 64  =  Option Code #64        64  -  40h      192  -  C0h
```

FIG. 11B

Option Codes (ConfigData.OptionCode[Num]) (continued)

```
OpCode                              Setting
   #    Description          YES               NO 65 = Option Code #65     65 - 41h      193 - C1h
  66 = Option Code #66     66 - 42h      194 - C2h
  67 = Option Code #67     67 - 43h      195 - C3h
  68 = Option Code #68     68 - 44h      196 - C4h
  69 = Option Code #69     69 - 45h      197 - C5h
  70 = Option Code #70     70 - 46h      198 - C6h
  71 = Option Code #71     71 - 47h      199 - C7h
  72 = Option Code #72     72 - 48h      200 - C8h
  73 = Option Code #73     73 - 49h      201 - C9h
  74 = Option Code #74     74 - 4Ah      202 - CAh
  75 = Option Code #75     75 - 4Bh      203 - CBh
  76 = Option Code #76     76 - 4Ch      204 - CCh
  77 = Option Code #77     77 - 4Dh      205 - CDh
  78 = Option Code #78     78 - 4Eh      206 - CEh
  79 = Option Code #79     79 - 4Fh      207 - CFh
  80 = Option Code #80     80 - 50h      208 - D0h
  81 = Option Code #81     81 - 51h      209 - D1h
  82 = Option Code #82     82 - 52h      210 - D2h
  83 = Option Code #83     83 - 53h      211 - D3h
  84 = Option Code #84     84 - 54h      212 - D4h
  85 = Option Code #85     85 - 55h      213 - D5h
  86 = Option Code #86     86 - 56h      214 - D6h
  87 = Option Code #87     87 - 57h      215 - D7h
  88 = Option Code #88     88 - 58h      216 - D8h
  89 = Option Code #89     89 - 59h      217 - D9h
  90 = Option Code #90     90 - 5Ah      218 - DAh
  91 = Option Code #91     91 - 5Bh      219 - DBh
  92 = Option Code #92     92 - 5Ch      220 - DCh
  93 = Option Code #93     93 - 5Dh      221 - DDh
  94 = Option Code #94     94 - 5Eh      222 - DEh
  95 = Option Code #95     95 - 5Fh      223 - DFh
  96 = Option Code #96     96 - 60h      224 - E0h
```

FIG. 11C

METHOD AND APPARATUS FOR UTILIZING A SEQUENCE INTERPRETER APPROACH TO CONTROL LOGIC OF A PROGRAMMABLE LOGIC CONTROLLER

BACKGROUND OF THE INVENTION

The present invention pertains to programmable logic controllers (PLCs), and more particularly, to PLCs that utilize a sequential interpreter approach in executing their control logic.

The use of PLCs has revolutionized the process control industry. One example of the use of PLCs in process control is in the manufacture of semiconductors. The blending of two or more fluids to form a blended gaseous mixture for combining a semiconductor liquid or gas with a carrier gas for delivery to a fabrication tool requires precise process control. Typically, controlling this type of process by PLC involves using sequence control logic (i.e., opening/closing valves, checking alarm setpoints, etc.) in the PLC and is accomplished via sequential ladder logic programming. This is the standard approach and works well for a fixed control scheme architecture. However, any changes to the control scheme requires ladder logic modifications by an individual with this skill set. Moreover, the memory usage by such fixed control scheme architecture is inefficient.

In particular, classical PLC software utilizes a ladder logic design, which has accounted for a large portion of programming for standard automation applications. The hierarchy of this type of application is shown in FIG. 1. Applications can be constructed which are fairly complex using this programming technique, and the applications which result are able to be maintained by a large cross-section of the process control community, as well as local engineers and technicians with a minimum of training. Although this programming technique is easily constructed, it is not particularly efficient in memory usage when compared with other available languages. There has remained a need to construct code segments that could be used for multiple gas stream control such as first and second input flows of a gas cabinet where the input flows are blended Unfortunately, ladder logic does not easily accomplish this.

By way of example only, the Assignee of the present invention, namely, Air Products & Chemicals, Inc., has used PLCs in its product line and with the release of its Gasguard® 450 (approximately 1990) product line, the technique of using external configurable data to control system operation has been used for gas cabinet-related equipment. Subsequent generations of Gasguard®, including Gasguard® 250, 500, AP2 and AP3, have all used this same method. However, the primary difference is that each of the aforementioned products utilizes an embedded control system of various types and manufacturers.

Attempts at overcoming these problems included developing a code for a PLC application for a mass-customized (MC) gas cabinet but that application rapidly ran out of memory when using this direct programming method. It was suggested to use custom STL (statement list) routines and SCL (structured control language) routines to supplement a basic top-level ladder logic routine in areas that would result in a savings of memory and would allow code segment reuse when possible. One of the areas of the memory usage problem is the standard call sequence in the PLC. Each call to a routine resulted in a large overhead memory usage and a low level STL routine was constructed that allowed multiple-called code to be used without this overhead memory usage. This reduced the memory usage by a significant amount. The second area of the memory usage problem was the lack of timers available in the chosen hardware set. Because of the low number of timers available, a custom timing routine was constructed in STL. Although the inclusion of STL in the application was not desired, it was included because of memory limitations. Many of the analog scaling and alarm functions would be coded using SCL, which, although less desirable than ladder logic, was clearly more desirable than the STL segments. The resulting hierarchy is shown in FIG. 2.

The resulting PLC application software utilized ladder logic for the overall execution loop, with SCL custom sequences and low-level STL service routines. The application configuration data was used to customize the individual application with selected options and alarm limits, etc. However, even with these compromises in programming approach, the application clearly was not able to fit within the constraints of the selected hardware. The resulting code consisted of three separate programming languages and the STL segments were seen as a potential problem for code maintenance.

Thus, there remains a need for a PLC that utilizes the external control data technique on a PLC-based control system which is not typically utilized in this manner.

All references cited herein are incorporated herein by reference in their entireties.

BRIEF SUMMARY OF THE INVENTION

A method for controlling a process using a programmable logic controller (PLC) having a central processing unit (CPU) which includes a load memory which stores all instructions and data required for controlling the process and an interpreter that evaluates and executes instructions in a work memory to control the process. The method comprises the steps of: (a) creating instructions comprising a format that includes at least one option code that is coded as being enabled or disabled; (b) copying one instruction from the load memory to the work memory; (c) evaluating, by the interpreter, the at least one option code to determine if the option code is true; (d) executing the instruction if the option code is evaluated by the interpreter to be true, or not executing the instruction if the option code is evaluated by the interpreter to be false and if so to copy the next instruction from the load memory to the work memory and repeating step (c) for this next instruction; (e) checking to see if the instruction whose option code has been evaluated to be true has been completed and if not to continue to execute the instruction to completion; and (f) if the instruction whose option code has been evaluated to be true has been completed, repeating steps (b)-(f)until all of the instructions have been evaluated and executed where evaluation of said at least one option code in the corresponding instruction has been determined to be true.

A programmable logic controller (PLC) for controlling a process coupled thereto and wherein the PLC includes a central processing unit (CPU) which includes a load memory that stores all instructions and data required for controlling the process and an interpreter that evaluates and executes instructions in a work memory to control the process. The PLC comprises: the load memory containing read-only instructions wherein each instruction comprises a format that includes at least one option code that is coded as being enabled or disabled; and the work memory that receives only one instruction at a time, wherein the interpreter evaluates the at least one option code to determine if the at least one option code is true and to execute the one instruction if the at least one option code is true, or receiving the next instruction if the least one option code is evaluated to be false.

BRIEF DESCRIPTION OF SEVERAL VIEWS OF THE DRAWINGS

The invention will be described in conjunction with the following drawings in which like reference numerals designate like elements and wherein:

FIGS. 11A-11C together constitute a chart of the 96 option codes in an exemplary configuration showing the unique setting level (yes or not) for each option code which is set by the configuration programmer.

DETAILED DESCRIPTION OF THE INVENTION

The present invention uses a non-traditional approach to programming sequential control logic in a PLC whereby sequential control is accomplished using separate, pre-configured binary data. In particular, the present invention concentrates on SCL (structured control language) and ladder logic, but also introduces the concept of a sequence interpreter and sequence datablocks. This approach is chosen to minimize the memory usage and to allow a more flexible configuration environment using pre-tested code in a mass-customized environment.

Figure 1:
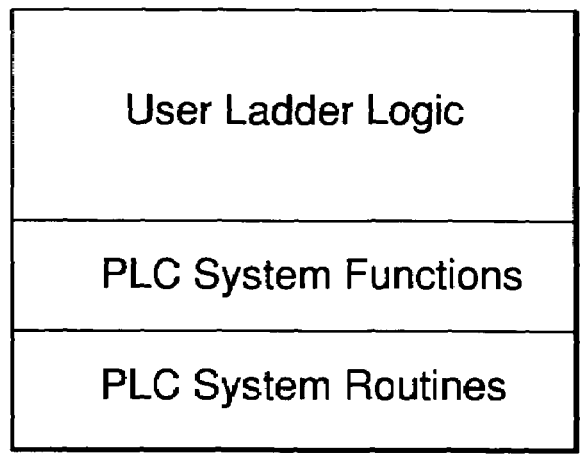
FIG. 1 is a hierarchy of a conventional PLC software application.
Figure 2:
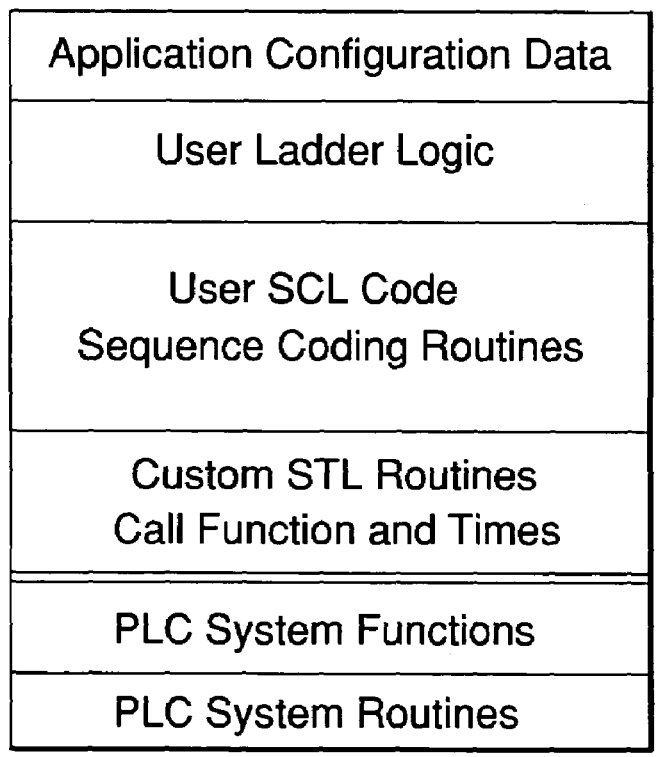
FIG. 2 is a hierarchy of another PLC software application directed to solving memory usage concerns.
Figure 3:
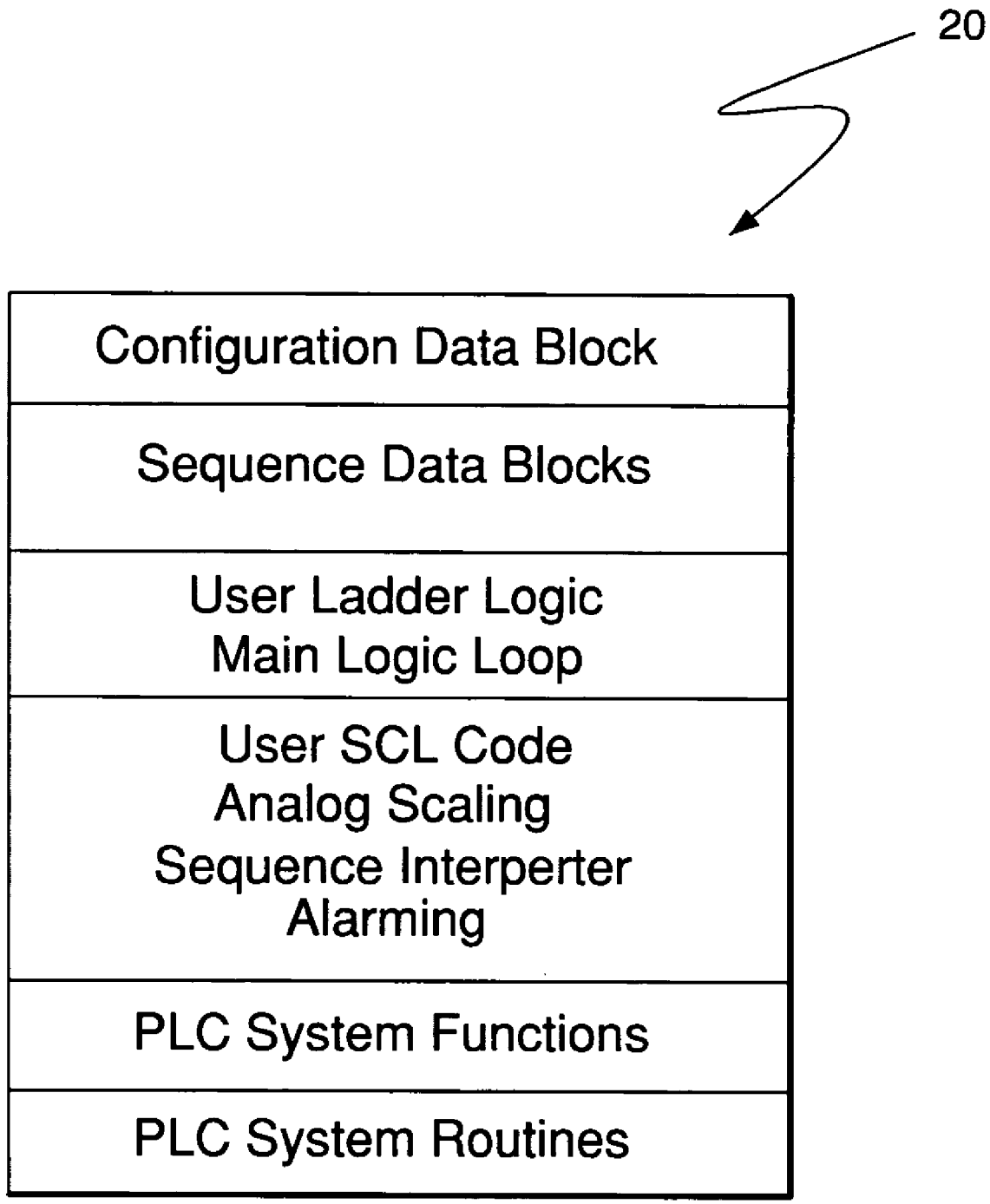
FIG. 3 is a hierarchy of the present invention PLC software application that overcomes the memory usage concerns while reducing the level of complexity to implement a change.

As mentioned earlier, this approach is different from the traditional straight-line programming model and utilizes a meta-code interpreter. Under this model, individual sequences (or events, e.g., purge valve #1, purge valve #2, open vent, etc.) can be represented in data blocks that are interpreted by a meta-code interpreter. The data to represent the sequence is only a fraction of the size that would be needed to construct custom code to accomplish the sequence. Although the size of the meta-code interpreter may be larger than any one sequence, the same code is used for all sequences and this results in a tremendous reduction in required memory. The use of this interpreter model also allows for modifications to be made in individual sequences without the need for the underlying code to be re-verified because individual code segments are not being changed, only data is changed. The hierarchy 20 of this approach of the present invention is shown in FIG. 3.

Figure 4:
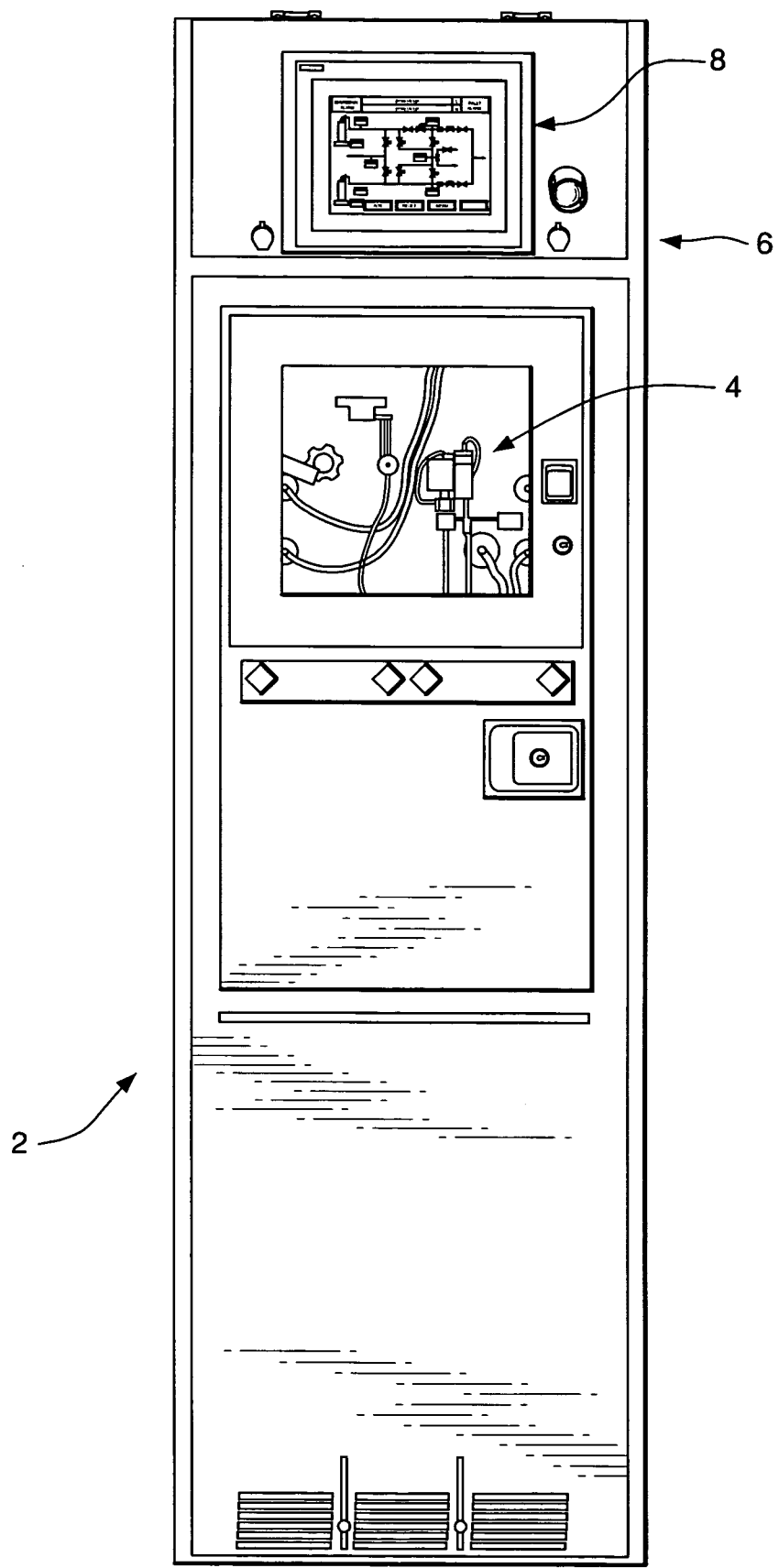
FIG. 4 is a front view of an exemplary gas cabinet having a PLC mounted inside an upper portion thereof.
Figure 5:
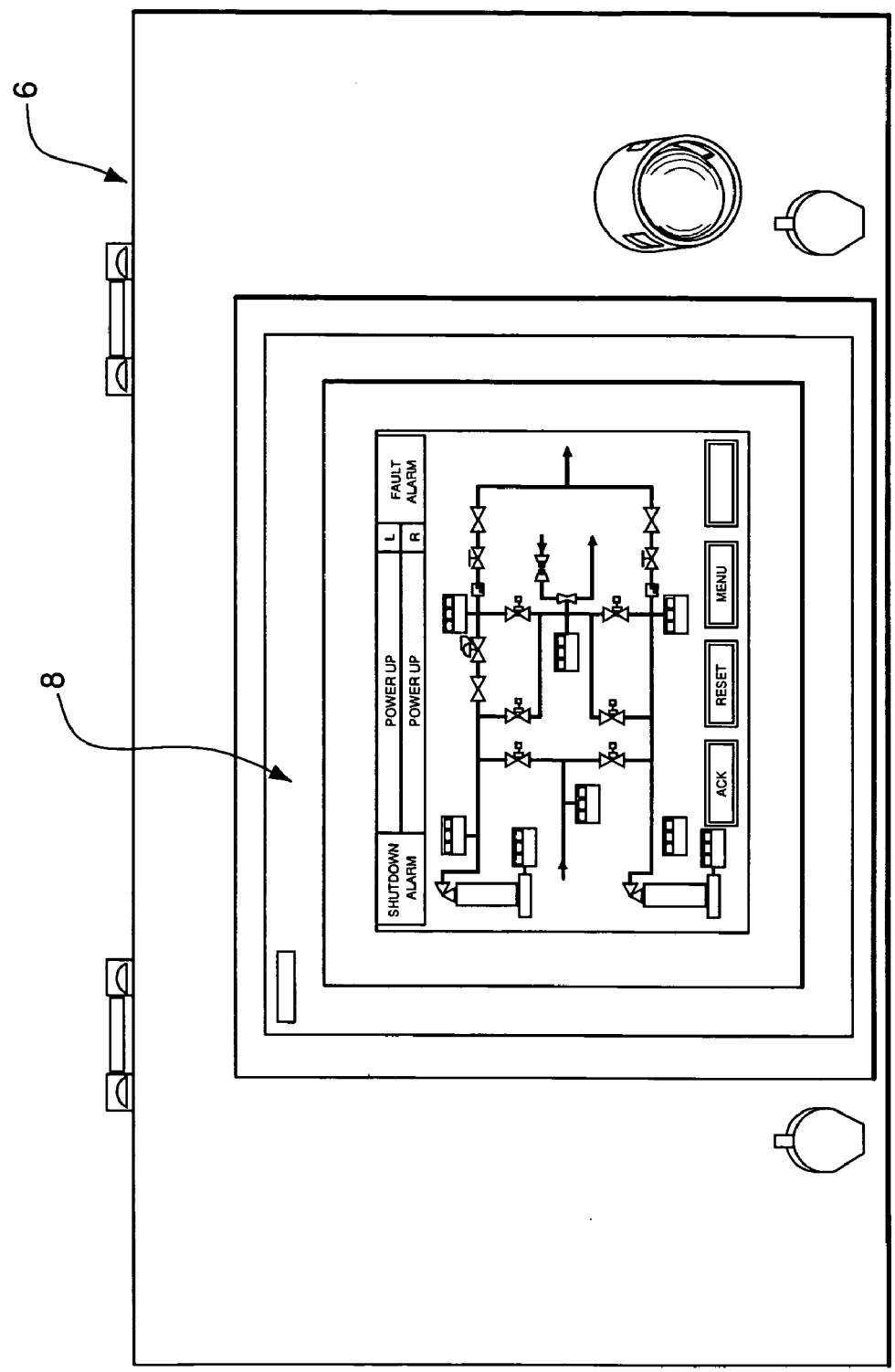
FIG. 5 is a front view of an exemplary touch screen for communicating with the PLC.

FIG. 4 depicts a front view of an exemplary gas cabinet 2 that contains various valves, pressure switches, gas cylinders, etc. (all of which are hereinafter referred to as "equipment 4"). This equipment 4 is controlled by the PLC (not shown) which is located inside the upper portion 6 of the gas cabinet 2. Although a variety of input/output (I/O) devices for communicating with the PLC are known, one exemplary I/O device is a touch screen 8, as shown in FIG. 5.

Figure 6:
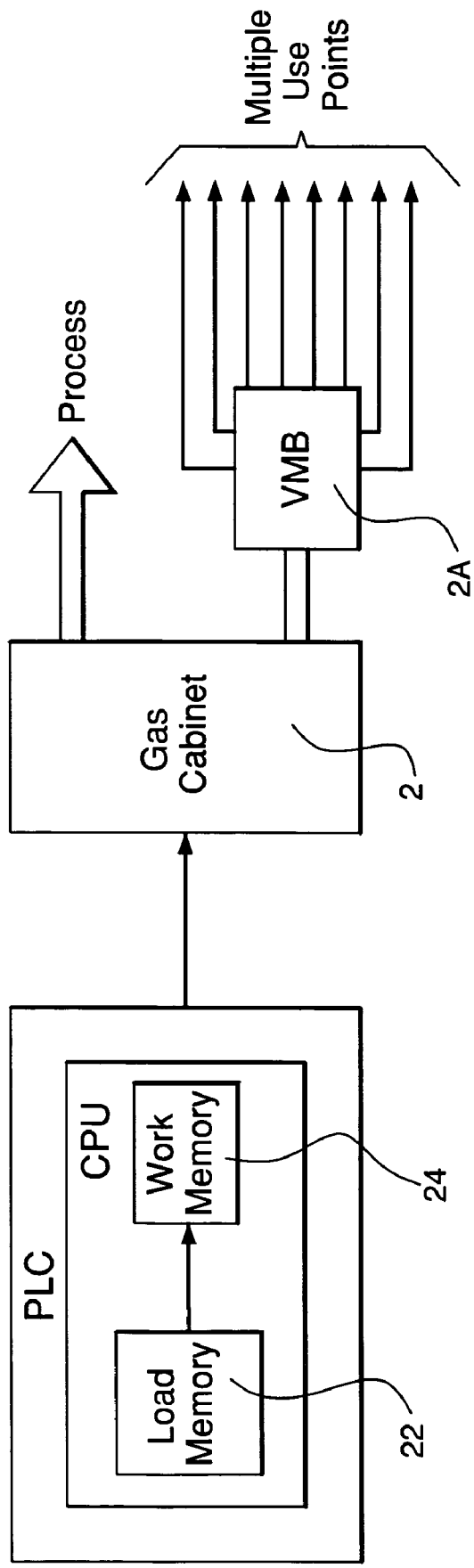
FIG. 6 is a functional diagram of the central processing unit (CPU) of a PLC comprising the hierarchy of the present invention.

As shown in FIG. 6, the central processing unit (CPU) of the PLC (by way of example only, a Siemens PLC model no. S7-300) comprises a load memory 22 and a work memory 24. Because the sequence data is contained completely within data blocks, it becomes possible to maintain sequence data blocks on the load memory (e.g., a flash card) and load data blocks for sequences into the work memory 24 as needed. This further reduces the memory usage. The only sequence that needs to be maintained in the work memory 24 is the idle sequence, since this sequence is the default sequence for the termination of all other sequences. The PLC controls the gas cabinet equipment 2 for the process (e.g., a customer's fabrication tool). It should also be noted that a virtual manifold box (VMB) 2A can be coupled to the gas cabinet 2 which permits a single gas cabinet 2 to supply multiple use points.

By using a separate data source to configure the sequence of events in the PLC, two problems are solved:

1. Internal PLC memory constraints are bypassed since the binary control data is stored in a separate, non-volatile flash memory area, which is available at a reasonable cost and can be expanded as needed; and 2. Configuration of the PLC-based control system can be accomplished using the same proven tools and techniques utilized on previous generation embedded systems.

Figure 7:
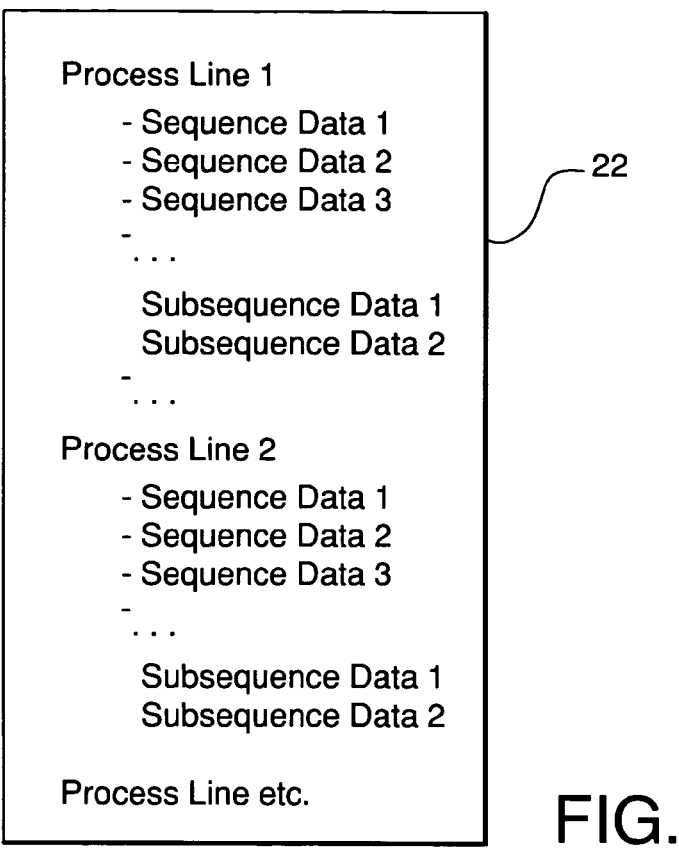
FIG. 7 is a diagram of the contents of the load memory of the CPU of a PLC comprising the hierarchy of the present invention.
Figures 8, 9:
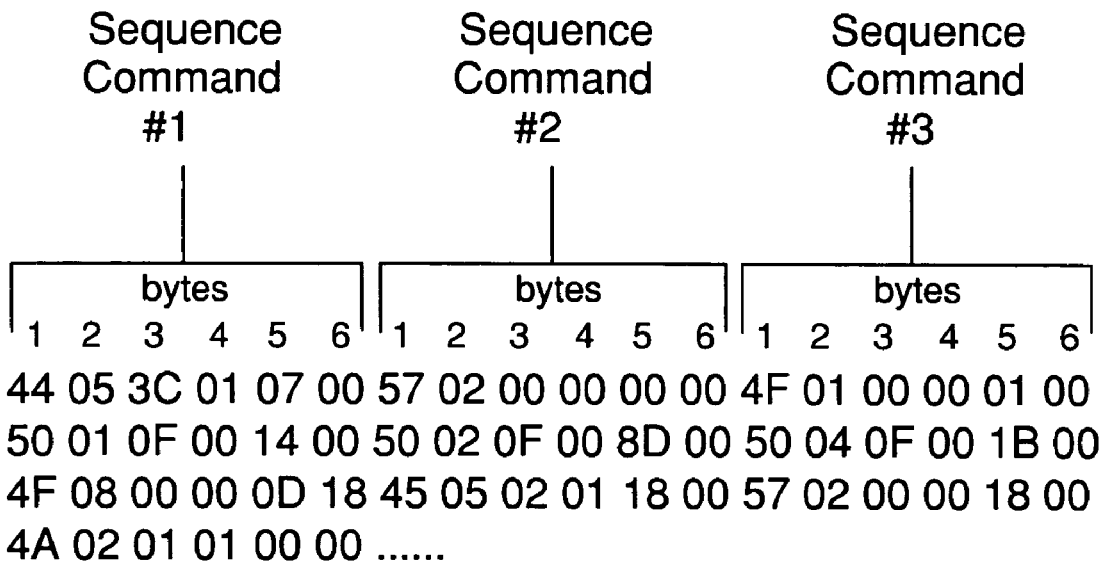
FIG. 8 is a chart that defines the format of the sequence command structure of the present invention.
FIG. 9 is a diagram depicting a sequence data block in the load memory.

The load memory 22 is a non-volatile flash card and contains ready-only sequence data (FIG. 7). Each sequence data block consists of a series of command instructions. The sequence data block size is expandable but currently contains a maximum of 160 command instructions. Each individual sequence command instruction consists of, by way of example only, six bytes of data, as shown in FIG. 8. FIG. 9 provides an example of a sequence data block in the load memory 22 showing three sequence commands, namely, sequence commands #1, #2 and #3.

Figure 10:
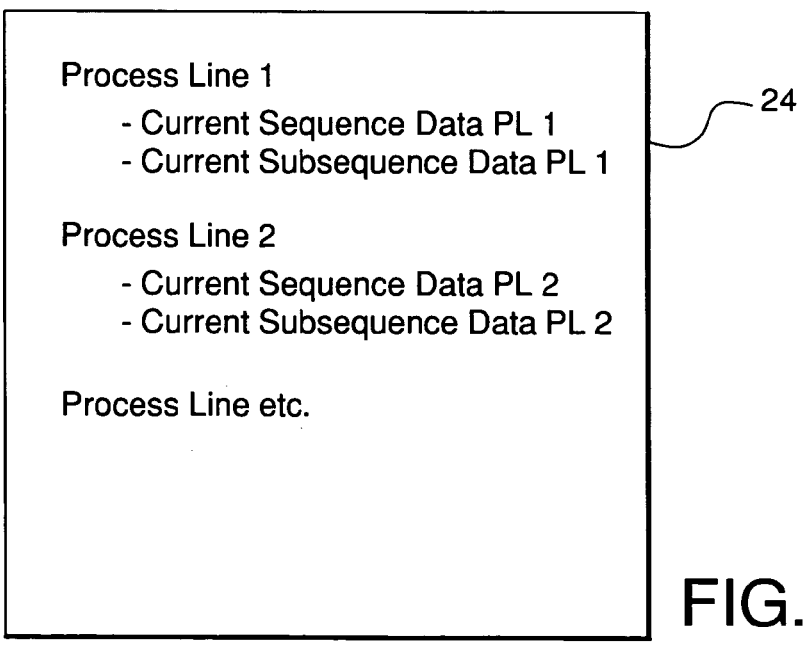
FIG. 10 is a diagram of the contents of the work memory of the CPU of a PLC comprising the hierarchy of the present invention.

The work memory 24 is internal CPU volatile data of limited size. A unique current sequence data block and subsequence data block is maintained for each process line (see FIG. 10). The subsequence data block basically are internal loops or macros that are called by the sequence data block to perform any repetitive function. Current sequence data PLx block size is large enough to handle one command instruction (six bytes). Currently executing command remains in this block until completely executed.

Depending on the particular application, i.e., process to be controlled by the PLC, the configuration programmer, using a software tool, selects which option codes (also referred to throughout this Specification as "opcodes") are to be active in the process. By way of example only, there are currently 96 option codes available that can be used to configure the PLC to provide for particular control of a particular process.

Thus, before a particular PLC configuration is delivered to a customer, the configuration programmer selects those option codes (from the overall 96 available option codes) that are necessary to control the particular customer's process. "Selecting an option" code involves encoding the last two bytes of the command structure so that when these two last bytes are evaluated by the interpreter, they both evaluate to "true." If just one of these last two bytes do not evaluate to "true", the command they are associated with is not executed. Conversely, if both of these bytes evaluate to "true" the associated command is then executed. In this manner, the 96 overall Option Codes do not have to added or deleted from the actual software; instead, they are either enabled or disabled by use of the opcode evaluations. FIGS. 11A-11C form a chart that provides an exemplary listing of the option codes for a particular process configuration. As can be seen, all of the option codes are available and it is up to the configuration programmer to select which option codes are to be implemented. As can also be appreciated, each option code can be designated with a unique hex value for "yes" or "no".

Figure 12:
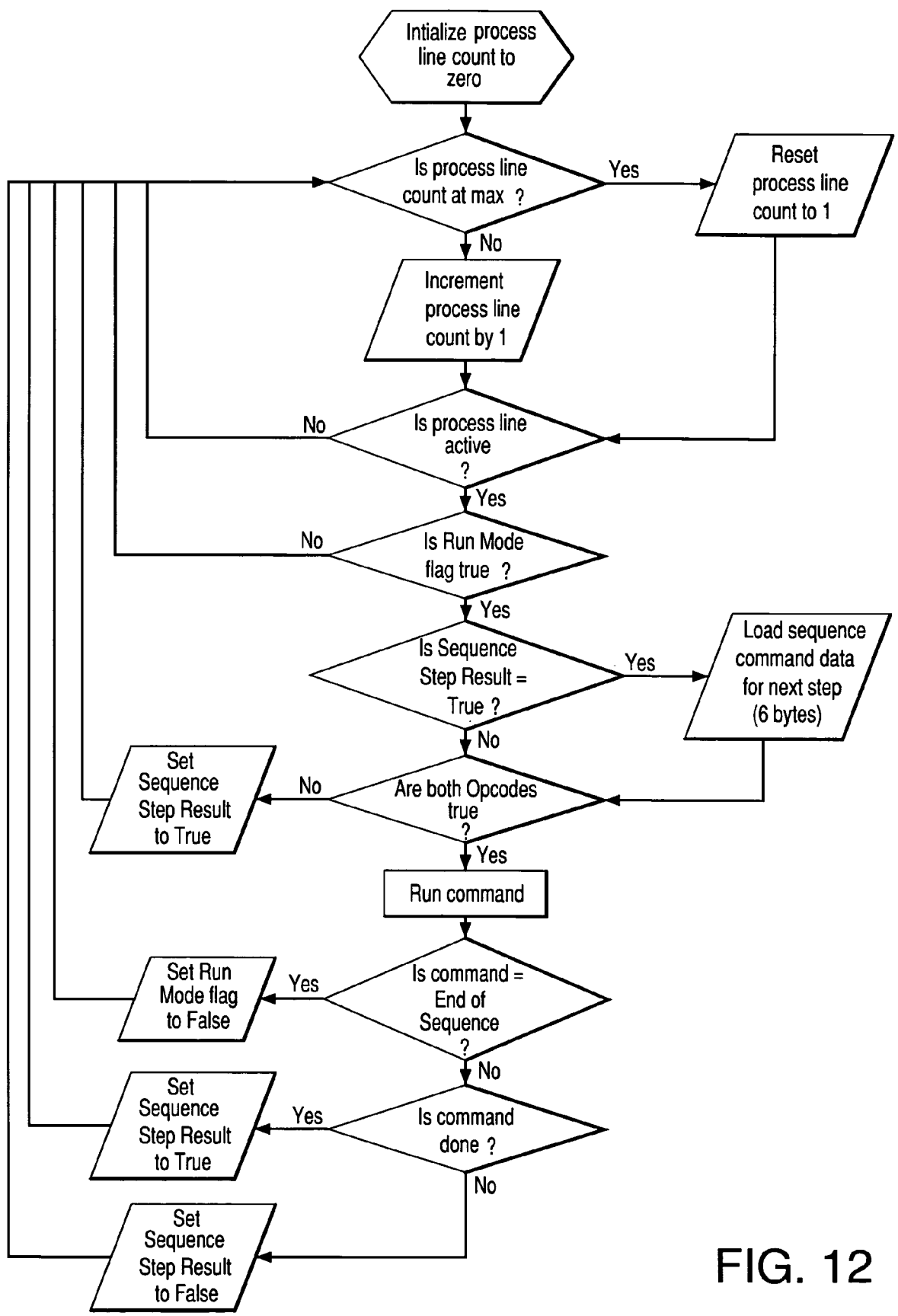
FIG. 12 is a flow diagram of the PLC interpreter application that overcomes the memory usage concerns while reducing the level of complexity to implement a change.

FIG. 12 provides a flow diagram of the PLC interpreter operation in executing the invention of the present application.

When a sequence is begun, the first command instruction (consisting of 6 bytes) is copied from the appropriate sequence data block in the load memory 22 to the corresponding process line's data block in the work memory 24. The format of the sequence command structure is given in FIG. 8. When the sequence interpreter runs (i.e., every scan), the interpreter attempts to execute the command in this local data block.

The last two bytes of the command structure, OpCode1 and OpCode2, are evaluated to determine if the command should be run or skipped; see FIGS. 8 and 9. In order for the command to be executed, both opcode parameters must be true. These parameters contain values which relate to option codes which are utilized by the configuration programmer to determine if an option currently exists in the system. An opcode with a value of zero (0) indicates the parameter is not used and will always evaluate as true. By way of example only, there are currently 96 option codes available to be used to configure the software.

If the opcode check evaluates to true, the command is executed by the sequence interpreter. Conversely, if the opcode check evaluates to false, the command is not executed.

The sequence interpreter returns two Boolean parameters to the calling function; SeqStepResult and SeqEndResult. SeqStepResult indicates whether the command (step) has been completed. Some commands will take numerous CPU scans to complete and will return a false SeqStepResult until it eventually completes the command. When a SeqStepResult of true is received, the sequence command is incremented to the next step, while a SeqStepResult of false will prevent the next command from being retrieved and evaluated. The SeqEndResult indicates that the end of the sequence has been reached. When this parameter is true, the sequence interpreter stops evaluating commands for this process line.

Every CPU scan, the process line indicator variable is incremented. When the maximum process line is reached, the process line variable indicator returns to process line 1. Assuming sequences are running for every process line, the sequence interpreter first evaluates the current command for process line 1. On the next scan, the sequence interpreter evaluates the current command for the next process line. This continues to the last process line at which time the sequence interpreter returns to process line 1 at the next CPU scan.

Using the system and method of the present invention provides the additional benefits of:
lower system memory requirements translates to lower system costs;
operational modifications to system need not be done by a PLC programmer;
sequence interpreter logic is portable and can be reused on other product lines;
configuration data can be assembled to accommodate all system options (master template);
configuration data is encapsulated into several data blocks, which can be easily stored, validated and revision-controlled;
invalid command instructions can be detected and subsequent appropriate error handling measures taken;
future changes can be accomplished without modifying existing, tested underlying logic code;
additional sequence logic blocks can be added without impacting work memory;
sequence interpreter command list can be expanded or enhanced as needed;
sequence logic can be programmed once to handle all possible options and configurations; and
individual logic instructions can be enabled or disabled via simple Boolean variables (option codes). This is performed at run-time.

Initial efforts have indicated that this approach allows both the MC Cabinet and code sets for the VMB 2A (in particular, the eight-stick VMB 2A, where the eight refers to eight individual flow lines) to be accomplished with the present hardware set, while preserving much of the flexibility of controller series of the Assignee.

The shift to this type of approach toward the integration of sequences through data blocks should allow the eight-stick VMB 2A to be fielded using the present hardware platform instead of requiring the use of a larger PLC. This further reduces the number of standard part numbers needed for manufacturing, since one controller can be used for both gas cabinets and eight-stick VMBs. This approach may also allow expanded use of existing editors as a basis for configuration, which would reduce the amount of retraining necessary for manufacturing configuration.

While the invention has been described in detail and with reference to specific examples thereof, it will be apparent to one skilled in the art that various changes and modifications can be made therein without departing from the spirit and scope thereof.

The invention claimed is:

1. A method for controlling a process using a programmable logic controller (PLC) having a central processing unit (CPU) which includes a load memory which stores all instructions and data required for controlling the process and an interpreter that evaluates and executes instructions in a work memory to control the process, said method comprising the steps of:

(a) creating instructions comprising a format that includes at least one option code that is coded as being enabled or disabled;

(b) copying one instruction from said load memory to said work memory;

(c) independently evaluating, by said interpreter, said at least one option code to determine if said option code is true;

(d) executing said instruction if said option code is evaluated by said interpreter to be true, or not executing said instruction if said option code is evaluated by said interpreter to be false and if so to copy the next instruction from said load memory to said work memory and repeating step (c) for this next instruction;

(e) checking to see if said instruction whose option code has been evaluated to be true has been completed and if not to continue to execute said instruction to completion; and (f) if said instruction whose option code has been evaluated to be true has been completed, repeating steps (b)-(f) until all of said instructions have been evaluated and executed where evaluation of said at least one option code in the corresponding instruction has been determined to be true.

2. The method of claim 1 wherein said step of creating instructions comprises generating sequence data blocks, each sequence data block comprising a series of instructions required to accomplish a unique sequence or event in controlling the process.

3. The method of claim 1 wherein said format comprises two option codes wherein each of said option codes is coded as being enabled or disabled and wherein said step of executing said instruction occurs only if said interpreter evaluates both of said option codes as being true and not executing said instruction if at least one of said option codes is evaluated to be false.

4. The method of claim 1 wherein each of said instructions comprises six bytes.

5. The method of claim 4 wherein said instruction format further comprises a plurality of parameters in addition to said at least one option code, each of said parameters and said at least one option code being one byte in size.

6. The method of claim 1 wherein an option code of zero is always evaluated by said interpreter to be true.

7. The method of claim 1 wherein the process is a gas flow process and wherein said PLC controls process equipment in a gas cabinet.

* * * * *